J. C. Rankin,

Line Fastener.

No. 100,803. Patented Mar. 15, 1870.

Witnesses
Peter Cooke
G. M. Ackerman

Inventor
John C. Rankin
per H. H. Haight
Attorney

United States Patent Office.

JOHN CALVIN RANKIN, OF MOUNT VERNON, NEW YORK.

Letters Patent No. 100,803, dated March 15, 1870.

IMPROVED CLOTHES-LINE HOLDER.

The Schedule referred to in these Letters Patent and making part of the same.

*To all whom it may concern:*

Be it known that I, JOHN CALVIN RANKIN, of Mount Vernon, in the county of Westchester, and State of New York, have invented a new and improved Cleat for Securing Clothes-Lines and other cords or ropes to suitable fixtures; and I do hereby declare that the following is a full, clear, and exact description of the same, reference being had to the accompanying drawings and to the letters of reference marked thereon making a part of this specification.

This invention has for its object the obtaining of a device for securing clothes-lines in a fixed position while in use, and one which may be manufactured at a trifling cost, admit of the line being applied to it with the simplest manipulation possible, and capable of being attached to any ordinary fixture, such as the picket of a fence, the side of a building, a post, tree, &c., and be efficient in all cases.

The invention consists in the peculiar construction of the clothes-line cleat, as hereinafter set forth.

In the accompanying sheet of drawings—

Figure 1:
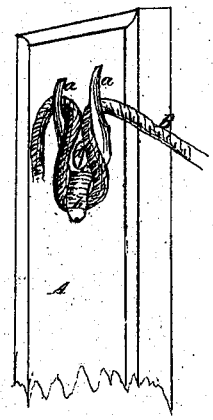

Figure 1 is a perspective view of my invention.

Figure 2:
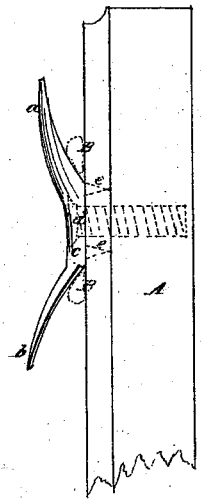

Figure 2, a side view of the same.

Figure 3:
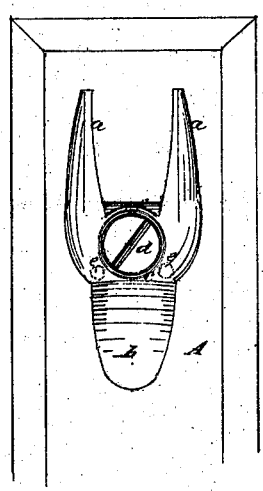

Figure 3, a face or front view of the same.

Similar letters of reference indicate corresponding parts in the several figures.

To enable others skilled in the art to fully understand and construct my invention, I will proceed to describe it.

The shape of my improved cleat is shown clearly in the drawings. It is composed of two tines or prongs, $a\ a$, and a pendent projection, $b$, all of which extend from a central portion, $c$, through which a screw, $d$, passes, to secure it to the fixture A.

This central portion has spurs, $e$, (three, more or less,) which project from its inner surface, and penetrate the fixture when the device is screwed to it, preventing any turning of the same on the screw. These spurs are represented by dotted lines in figs. 2 and 3.

The tines or prongs and the pendent projection $b$ extend out angularly or obliquely from the central portion $c$, as shown clearly in fig. 2, so as to form spaces, into which the line, rope, or cord B may be inserted. (see figs. 1 and 2.)

The application is as follows:

The line, rope, or cord is inserted behind one tine or prong $a$, passed down and behind the pendent projection $b$, and thence upward and behind the other tine or prong $a$, as shown clearly in fig. 1. When thus applied, the friction caused by the wedging or crowding of the line, rope, or cord in the angular spaces between the tines or prongs, the pendent projection, and the fixture is sufficient to hold said line, rope, or cord, and any strain to which it may be subjected will only tend to secure it more firmly. It is not necessary, however, in ordinary cases, in order to secure the line, to pull upon it after it is applied to the device. The simple application of it, as described, will be sufficient for the purpose.

This invention may be manufactured at a trifling cost, being of ordinary cast-iron, japanned or galvanized, to prevent oxidation. One screw only is required to secure it to the fixture. The spurs prevent it from turning on the screw.

It is not necessary, in order to secure the line, that a long piece be allowed to hang loose at one end. Two inches in length for the loose end will generally be sufficient.

It does not make any difference as regards the direction in which the line may be subjected to strain or tension. The latter may be in the same plane with the face of the fixture A, or more or less angular therewith. It will be held secure in all cases, and without danger of being cut or chafed, as there will be no appreciable movement of the line around the prongs and pendent projection.

Having thus described my invention,

What I claim as new, and desire to secure by Letters Patent, is—

The construction of the clothes-line holder with its three prongs, $a\ a$ and $b$, and center portion $c$ provided with the means to attach, as shown.

JNO. C. RANKIN.

Witnesses:
A. R. HAIGHT,
THEO. TUSCH.